United States Patent
Kim

(10) Patent No.: US 7,215,355 B2
(45) Date of Patent: May 8, 2007

(54) IMAGE CONTROL APPARATUS AND METHOD FOR MOBILE COMMUNICATION TERMINAL

(75) Inventor: Young-Hee Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 211 days.

(21) Appl. No.: 10/935,859

(22) Filed: Sep. 7, 2004

(65) Prior Publication Data

US 2005/0052526 A1 Mar. 10, 2005

(30) Foreign Application Priority Data

Sep. 6, 2003 (KR) ............... 10-2003-0062388

(51) Int. Cl.
*H04N 7/14* (2006.01)
(52) U.S. Cl. .............. 348/14.02; 348/14.01; 348/333.06; 348/373; 455/575.3
(58) Field of Classification Search .. 348/14.07–14.08, 348/376, 333.06, 373; 455/575.1, 575.3, 455/403, 550; 379/433.01, 433.04, 433.11, 379/433.13
See application file for complete search history.

(56) References Cited

U.S. PATENT DOCUMENTS

2002/0160724 A1* 10/2002 Arai et al. ............... 455/90
2003/0227564 A1* 12/2003 Lim ....................... 348/375

FOREIGN PATENT DOCUMENTS

KR 10 2003 0063726 A 7/2003

* cited by examiner

*Primary Examiner*—Melur Ramakrishnaiah
(74) *Attorney, Agent, or Firm*—Lee, Hong, Degerman, Kang & Schmadeka P.C.

(57) ABSTRACT

In a mobile communication terminal having a camera rotatively connected thereto, an apparatus and a method for controlling an image is provided. A photographic image generated by the camera can be reoriented so that the image appears inversed as a result of sensing a rotational position of the camera relative to the terminal. A position sensing unit detects a rotational position of a camera; a control unit compares the detected position to a default position and reorients the photographic image if the detected position does not correspond to the default position.

12 Claims, 4 Drawing Sheets

IMAGE CONTROL APPARATUS AND METHOD FOR MOBILE COMMUNICATION TERMINAL

CROSS REFERENCE TO RELATED APPLICATIONS

Pursuant to 35 U.S.C. § 119(a), this application claims the benefit of earlier filing date and right of priority to Korean Application No. 2003-62388, filed on Sep. 6, 2003, the contents of which is hereby incorporated by reference herein in their entirety.

BACKGROUND OF THE INVENTION

1. Field of the Invention

The present invention relates to a mobile communication terminal, and more particularly, to a method and apparatus for controlling a photographic image according to the rotation of a camera in a mobile communication terminal.

2. Description of the Related Art

FIG. 1 illustrates a perspective view of a mobile communication terminal according to the related art, in which a camera is installed on a hinge.

As shown therein, a related art terminal to which a camera is mounted includes: a main body 10, a first and second folding parts 10 and 11, respectively, a hinge portion 21 that rotatably connects the first and second folding parts 10 and 11, and a camera 35 installed in the hinge portion 21. On the inner surface of the first folding part 10, a plurality of terminal manipulation devices 13, shown here as buttons of a keypad, is installed. On the inner surface of the second folding part, a display screen 23 for displaying images and information is installed.

The hinge portion 21 includes first and second hinge parts 17 and 27, respectively, for coupling the first and second folding parts 10 and 11. The camera 35 is disposed adjacent to the first hinge part 17 along the outer edges of the terminal for ease of manual rotation of the camera. The camera 35 includes a module 36 for photographing a subject and a collar 38 for rotating the camera 35 so as to be able to photograph the subject.

When a still or dynamic image is photographed by the camera 35, a user holds and rotates the collar 38 in order to direct the camera module 36 onto the subject. The user then properly manipulates a one or more the terminal manipulation devices 13 to photograph the subject and reproduce the image on the display screen 23.

The terminal according to the related art generally has an internal default setting such that subjects photographed with the integrated camera appear properly oriented (i.e., right-side up) when the subjects are situated opposite to the display screen 23 (i.e., facing the back of the first folding part 11). However, when the camera is rotated such that the camera 35 is generally directed in the same direction as the display screen 23, the reproduced image created by the camera is inversely reproduced on the display screen 23 with respect to orientation. In other words, the image is inverted so that it appears upside-down. Alternatively, the image may appear upside-down if the camera is oriented in the opposite direction. Consequently, a correcting apparatus is required to allow for proper image reproduction.

As so far described, in the related art, when an image of a subject photographed by a camera mounted to a terminal is inversely displayed on a display unit according to a position of the camera, the user must either rotate the terminal or manipulate specific buttons to correct the orientation of the image. Therefore, an improved solution is needed to correctly display an inverted image reproduced by a rotating camera of a mobile communication terminal.

SUMMARY OF THE INVENTION

Accordingly, the present invention is directed to a mobile communication terminal with an integrated camera that substantially obviates one or more problems due to limitations and disadvantages of the related art above.

An object of the present invention is to provide for a method and apparatus for controlling a photographic image according to the rotation of a camera in a mobile communication terminal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a mobile communication terminal having an integrated camera rotatively connected thereto, the terminal comprising: a position sensing unit for detecting an orientation of the camera and outputting a detection signal; a control unit for receiving the detection signal and reorienting a photographic image generated by the camera according to the received detection signal; and a display unit for displaying the reoriented image.

According to one aspect of the present invention, the position sensing unit may comprise a protrusion disposed on an inner edge of the camera, wherein the protrusion correspondingly rotates with the camera, and a switch fixedly mounted in the terminal and in operational relationship with the protrusion according to the rotation angle of the camera. Furthermore, the switch may output the detection signal upon operational contact with the protrusion.

According to another aspect of the present invention, the position sensing unit may comprise a magnet disposed on an inner edge of the camera, wherein the magnet generates a magnetic flux and correspondingly rotates with the camera; and a magnetic sensing device fixedly mounted in the terminal, wherein the magnetic sensing device senses the magnetic flux generated by the magnet. Furthermore, the magnetic sensing device may output the detection signal upon sensing the magnetic flux generated by the magnet.

There is also provided a method for controlling an image in a mobile communication terminal, the method comprising the steps of: detecting a rotational position of a camera rotatively connected to the terminal; comparing the detected rotational position of the camera to a default position; and reorienting a photographic image generated by the camera if the detected rotational position of the camera does not correspond to the default position.

According to one aspect of the present invention, if the detected rotational position of the camera does correspond to the default position, then the photographic image is not reoriented and is displayed. Also, if the detected rotational position of the camera does correspond to the default position, then the photographic image is not reoriented and is displayed.

It is to be understood that both the foregoing general description and the following detailed description are exemplary and explanatory and are intended to further describe the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to the preferred embodiments of the present invention, examples of which are illustrated in the accompanying drawings.

Figure 1:
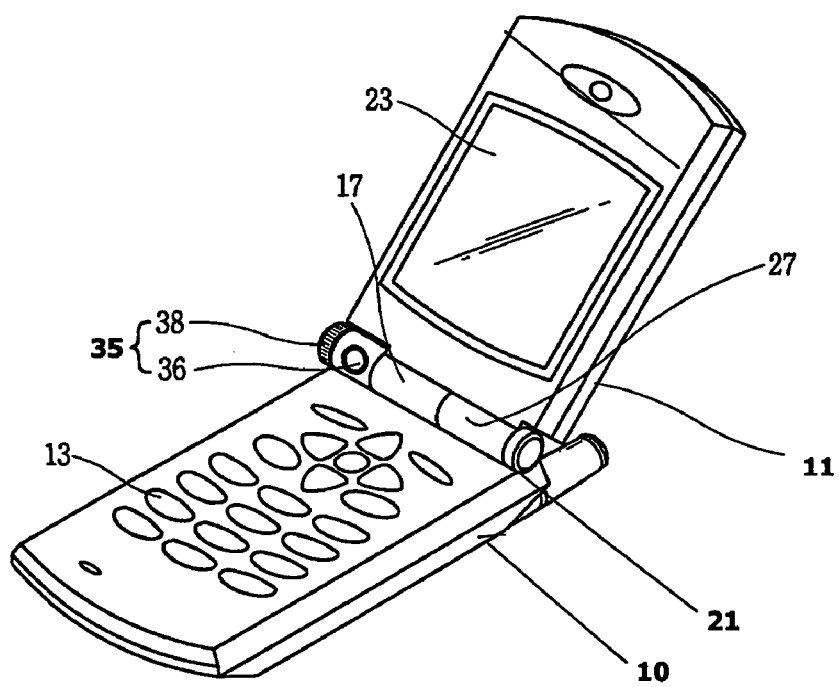
FIG. 1 illustrates a perspective view of a mobile communication terminal with an integrated camera in accordance with the related art.
Figure 2:
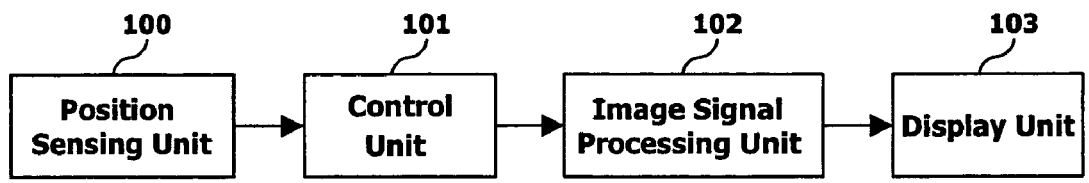
FIG. 2 illustrates a block diagram of an apparatus for controlling an image in a mobile communication terminal in accordance with an embodiment of the present invention.

Referring to FIG. 2, a block diagram of an apparatus for controlling an image in a mobile communication terminal, in accordance with a preferred embodiment of the present invention, is shown. The apparatus for controlling an image in a mobile communication terminal comprises a position sensing unit 100 for sensing a position of a camera and a control unit 101 for controlling an image signal processing unit 102. According to the sensory result of the position sensing unit 100, the control unit 101 controls the image signal processing unit 102 to reorient an image of a photographed subject, which is then displayed on a display unit 103.

Figure 3:
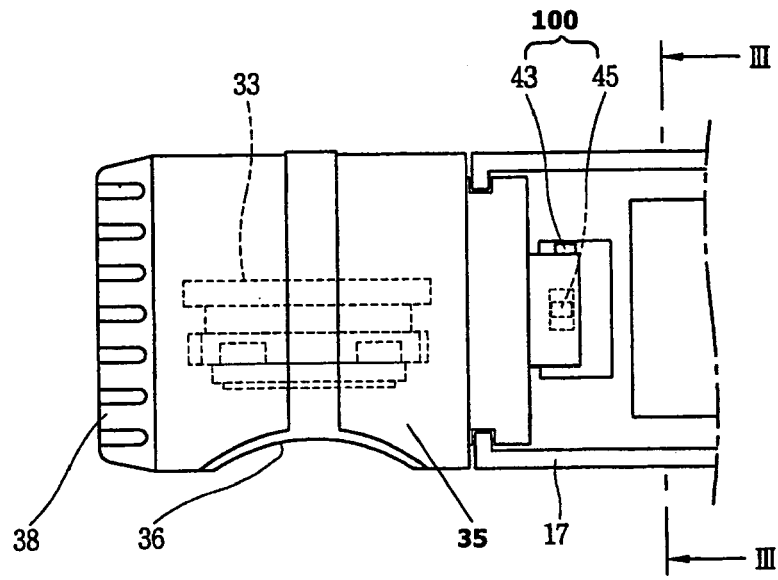
FIG. 3 illustrates a sectional view of an integrated camera having an apparatus for controlling an image in a mobile communication terminal in accordance with an embodiment of the present invention.
Figure 4:
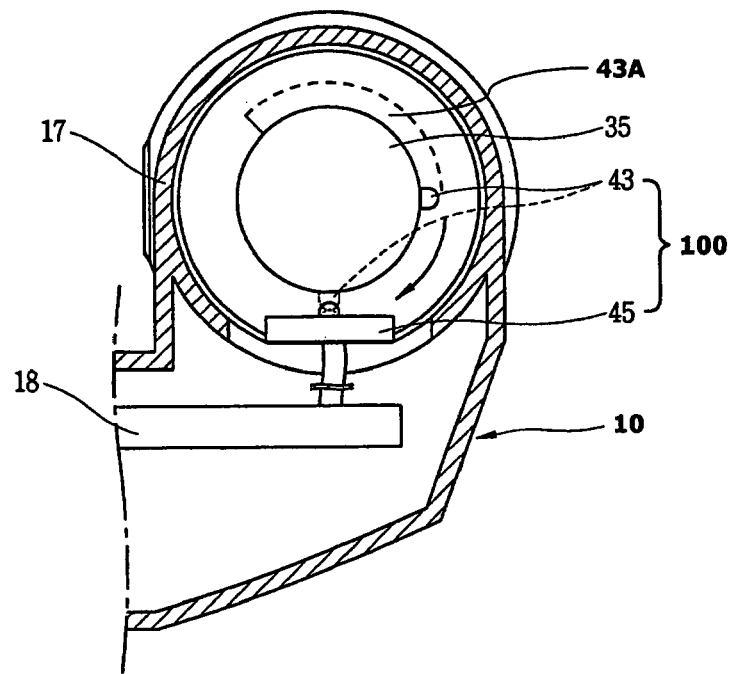
FIG. 4 illustrates a sectional view taken along line III—III of FIG. 3.

FIG. 3 illustrates a sectional view of an integrated camera having an apparatus for controlling an image in a mobile communication terminal, in accordance with a preferred embodiment of the present invention. FIG. 4 is a sectional view taken along line III—III of FIG. 3 and is an example of an embodiment using a mechanical switch. In FIGS. 3 and 4, the same reference numerals are applied to the same components as those of the related art for convenience.

Referring to FIG. 3, the position sensing unit 100 comprises a protrusion 43 formed at a side of a camera 35, which is disposed adjacent to the first hinge part 17 along the outer edges of the terminal for ease of manual rotation of the camera. The camera 35 comprises a module 36 for photographing a subject and a collar 38 for rotating the camera 35 so as to be able to photograph the subject. A photographic apparatus 33 is mounted in a radial direction within the module 36. A switch 45 is formed inside a first hinge part 17 and is to be in operational contact with the protrusion 43, according to the rotation of the camera 35.

In FIG. 4, the switch 45 is shown to be electrically connected to a printed circuit board (PCB) 18 so as to output a signal, such as an on/off signal, to the control unit 101 (which may be a processor for the mobile communication terminal) disposed in the PCB 18 when the protrusion 43 is rotated as a result of the rotation of the camera 35. Alternatively, the switch need not be connected to the PCB 18, but rather may be in electrical communication with the control unit 101 by other means, such as a communication cable, etc. Accordingly, if a user turns the collar 38 of the camera 35 so that the camera module 36 is directed towards a subject situated opposite to the direction of a display screen, the protrusion 43 comes in operational contact with the switch 45. As a result, an output, such as a switch-on signal (or a switch-off signal), for example, is inputted to the control unit 101.

In the example of the preferred embodiment shown in FIG. 4, the protrusion 43 contacts the switch 45, which comprises a button that is activated when pushed down by the protrusion 43. Accordingly, as the camera 35 is rotated, the protrusion 43 is correspondingly rotated and depresses the switch 45 upon contact. Subsequently, an output, such as a switch-on signal (or a switch-off signal), for example, is inputted to the control unit 101. The switch 45 remains depressed or activated (i.e., inverting the image received from the camera 35) until the camera 35 is rotated in the opposite direction. Alternatively, the protrusion 43 may be elongated so as to span approximately 135° in order to maintain the switch 45 in a depressed state when an inverted image is required. When the camera 35 is rotated in the opposite direction, the protrusion 43 contacts and depresses the switch 45, thereby deactivating the switch 45 or outputting a switch-off signal to the control unit 101, for example.

Figure 5:
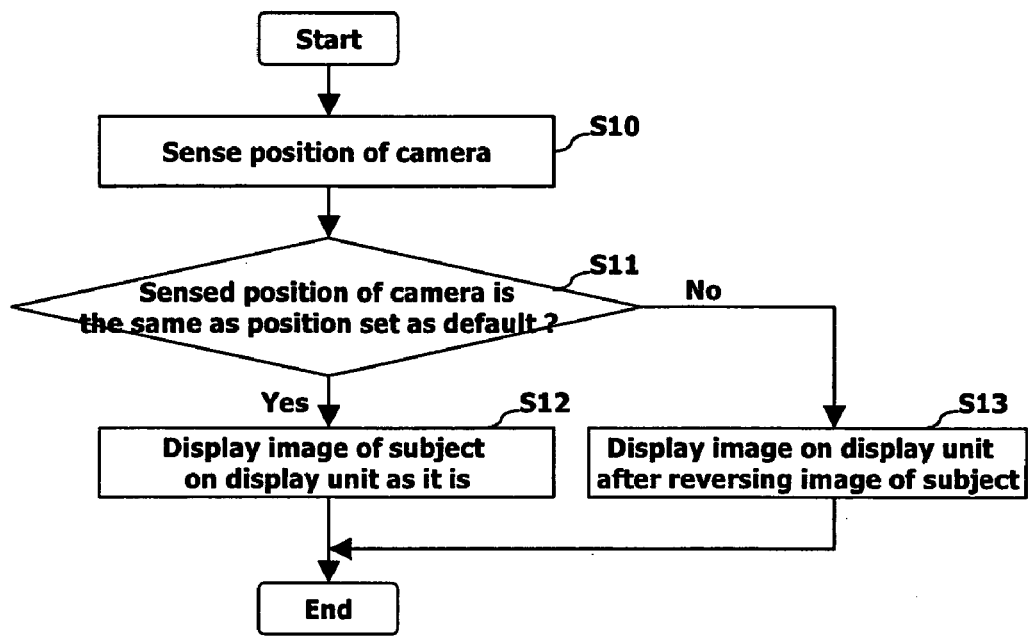
FIG. 5 illustrates a flow chart of operations for inversing an image by a control unit in accordance with an embodiment of the present invention.

As shown in FIG. 5, the control unit 101 recognizes a position of the camera 35, namely, whether the camera 35 is directed towards the front side of the terminal or the rear side, based upon a signal outputted from the position sensing unit 100 (S10). In step S11, the control unit 101 compares a current position of the camera 35 to a default setting position of the camera 35. If the current position of the camera 35 is the same as the default position, the control unit 101 controls the image signal processing unit 102 (step S12) to normally display an image of the photographed subject on the display unit 103, (i.e., the displayed image need not be reoriented or inversed). However, if the current position of the camera 35 is not the default position of the camera 35, the control unit 101 controls the image signal processing unit 102 to inverse the image of the subject to be displayed on the display unit 103 (step s13).

Figure 6:
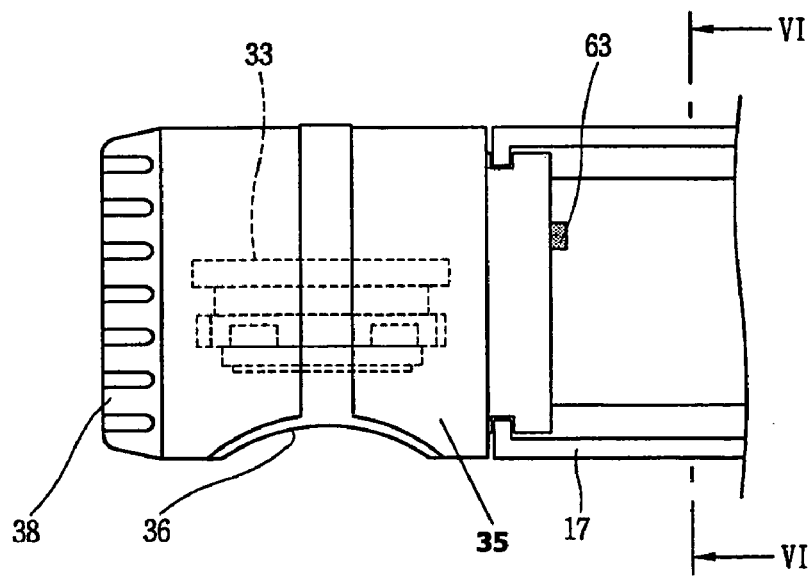
FIG. 6 illustrates a sectional view of an integrated camera having an apparatus for controlling an image in a mobile communication terminal in accordance with an alternative embodiment of the present invention.
Figure 7:
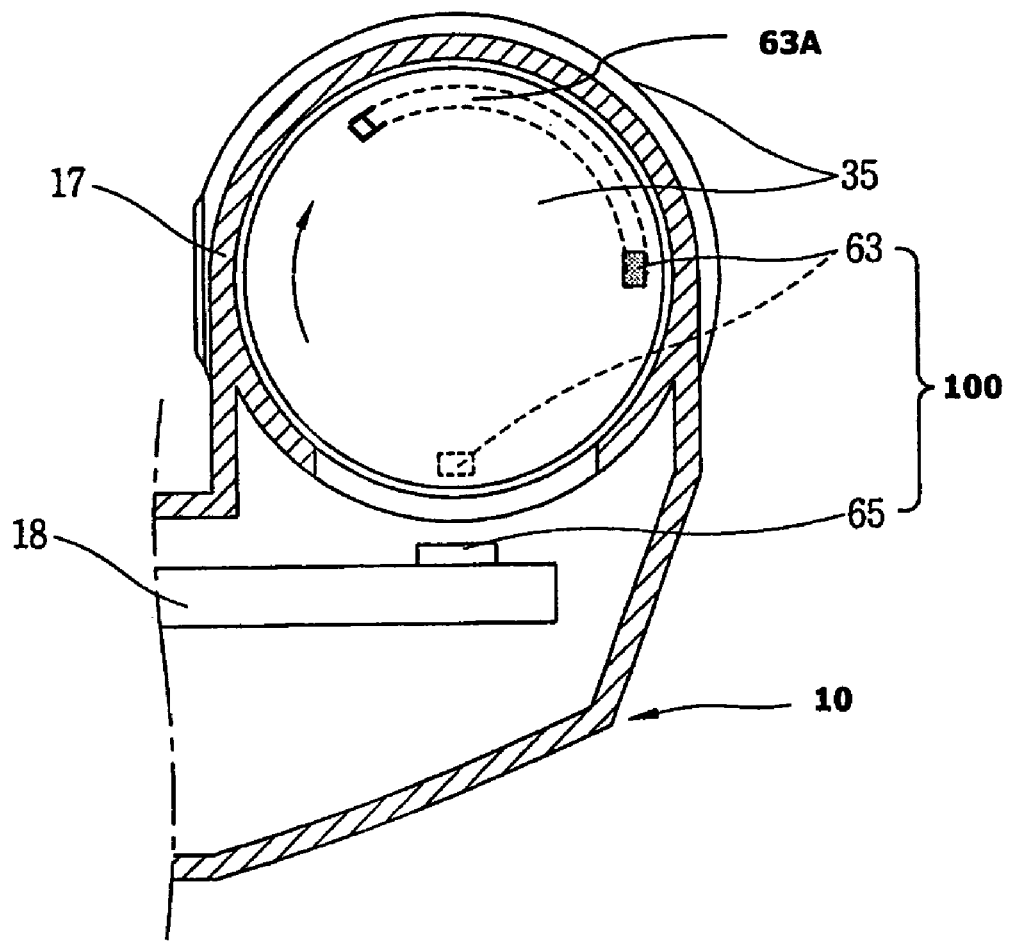
FIG. 7 illustrates a sectional view taken along line VI—VI of FIG. 6.

FIG. 6 illustrates a sectional view of an integrated camera having an apparatus for controlling an image in a mobile communication terminal in accordance with an alternative embodiment of the present invention. FIG. 7 is a sectional view taken along line VI—VI of FIG. 6 and is an example of an embodiment using a magnetic switch.

Referring to FIG. 6, the position sensing unit 100 comprises a magnet 63 mounted on an inner edge of the camera module 36 adjacent to the first hinge part 17. A magnetic sensing device 65 is fixedly mounted, preferably in the first hinge part, so that the magnet 63 comes in close proximity to the sensing device 65 during rotation of the camera 35. Preferably, the magnetic sensing device 65 comprises a switch, which is activated or deactivated in response to the magnetic field generated by the magnet 63.

As exemplified in FIG. 7, the magnetic sensing device 65 is preferably mounted on the PCB 18. Alternatively, the magnetic sensing device may be operationally connected, such as via an electrical connection, to the PCB 18. If a user rotates the camera 35, the magnet 63 rotates correspondingly and approaches the magnetic sensing device 65, which senses the magnet 63. Accordingly, the sensing device 65 outputs a signal, such as an on/off signal, to the controlling unit 101 upon sensing the polarity of the magnet 63.

An operational logic similar to that described in FIG. 5 is applicable to the embodiment described in FIGS. 6 and 7. That is, the control unit 101 recognizes a position of the camera, namely, whether the camera is directed towards the front side of the terminal or the rear side, based upon a signal outputted from the position sensing unit 100, which comprises the magnet 63 and the magnetic sensing device 65. Accordingly, the control unit 101 compares a current position of the camera, based upon the position of the magnet 63 relative to the magnetic sensing device 65, to a default setting position of the camera 35. If the current position of the camera 35 is the same as the default position, the control unit 101 controls the image signal processing unit 102 to normally display an image of the photographed subject on the display unit 103, (i.e., the displayed image need not be inversed). However, if the current position of the camera 35 is not the default position of the camera 35, the control unit 101 controls the image signal processing unit 102 to inverse the image of the subject displayed on the display unit 103.

In an alternative embodiment, the magnet 63 may be elongated circumferentially to span an arc, preferably of approximately 135°, thereby maintaining the magnetic sensing device 65 in an activated state (i.e., outputting signal to the control unit 101) throughout the rotation of the camera corresponding to the arc. In another alternative embodiment, the magnet 63 may generate a magnetic field that spans an arc, preferably of approximately 135°.

It will be apparent to those skilled in the art that various modifications and variations can be made in the present invention without departing from the spirit or scope of the invention. Therefore, the foregoing description of these embodiments of the present invention has been presented for the purposes of illustration and description. It is not intended to be exhaustive or to limit the invention to the precise form disclosed. Thus, it is intended that the present invention cover the modifications and variations of this invention provided they come within the scope of the appended claims and their equivalents. Preferred embodiments were shown in the context of folding type mobile communication terminals. In alternative embodiments, bar and PDA type terminals can be substituted for the present invention.

What is claimed:

1. A mobile communication terminal having a camera rotatively connected thereto, the mobile terminal comprising:
    a position sensing unit for detecting an orientation of the camera and outputting a detection signal;
    a control unit for receiving the detection signal and reorienting a photographic image generated by the camera in response to the received detection signal; and
    a display unit for displaying the reoriented image;
    wherein the position sensing unit comprises:
    a protrusion disposed on an inner edge of the camera, wherein the protrusion correspondingly rotates with the camera; and
    a single switch fixedly mounted in the terminal and in operational relationship with the protrusion according to the rotation angle of the camera;
    wherein the protrusion depresses the single switch when the protrusion is in operational contact with the single switch.

2. The mobile communication terminal of claim 1, wherein the protrusion comprises an elongated member disposed circumferentially on the inner edge of the camera so as to span an arc of approximately 135°.

3. The mobile communication terminal of claim 1, wherein the single switch outputs the detection signal upon operational contact with the protrusion.

4. A mobile communication terminal having a camera rotatively connected thereto, the mobile terminal comprising:
    a position sensing unit for detecting an orientation of the camera and outputting a detection signal;
    a control unit for receiving the detection signal and reorienting a photographic image generated by the camera in response to the received detection signal; and
    a display unit for displaying the reoriented image;
    wherein the position sensing unit comprises:
    a magnet disposed to rotate with the camera, wherein the magnet generates a magnetic field; and
    a magnetic sensing device fixedly mounted in the terminal, wherein the magnetic sensing device senses the magnetic field generated by the magnet.

5. The mobile communication terminal of claim 4, wherein the magnetic sensing device outputs the detection signal upon sensing the magnetic field generated by the magnet.

6. The mobile communication terminal of claim 5, wherein the magnetic field spans an arc of approximately 135°.

7. A method for controlling an image in a mobile communication terminal, the method comprising the steps of:
    detecting a rotational position of a camera rotatively connected to the terminal;
    comparing the detected rotational position of the camera to a default position; and
    reorienting a photographic image generated by the camera if the detected rotational position of the camera does not correspond to the default position;
    wherein the rotational position of the camera is detected by a protrusion disposed on an inner edge of the camera, the protrusion correspondingly rotating with the camera;
    wherein a single switch, which is fixedly mounted in the terminal and in operational relationship with the protrusion according to the rotation angle of the camera, outputs a signal corresponding to the detected rotational position of the camera upon operational contact with the protrusion.

8. The method of claim 7, further comprising the step of inversely displaying the photographic image if the detected rotational position of the camera does not correspond to the default position.

9. The method of claim 7, wherein if the detected rotational position of the camera does correspond to the default position, then the photographic image is not reoriented and is displayed.

10. A method for controlling an image in a mobile communication terminal, the method comprising the steps of:

detecting a rotational position of a camera rotatively connected to the terminal;

comparing the detected rotational position of the camera to a default position; and reorienting a photographic image generated by the camera if the detected rotational position of the camera does not correspond to the default position;

wherein:

the rotational position of the camera is detected by a magnet disposed on an inner edge of the camera;

the magnet generates a magnetic field and correspondingly rotates with the camera; and a magnetic sensing device, which is fixedly mounted in the terminal, senses the magnetic field generated by the magnet and outputs a signal corresponding to the detected rotational position of the camera.

11. The method of claim 10, further comprising the step of inversely displaying the photographic image if the detected rotational position of the camera does not correspond to the default position.

12. The method of claim 10, wherein if the detected rotational position of the camera does correspond to the default position, then the photographic image is not reoriented and is displayed.

\* \* \* \* \*